(12) United States Patent
Horowitz

(10) Patent No.: US 6,505,198 B2
(45) Date of Patent: *Jan. 7, 2003

(54) SORT SYSTEM FOR TEXT RETRIEVAL

(75) Inventor: Michael L. Horowitz, Pittsburgh, PA (US)

(73) Assignee: Claritech Corporation, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/933,937

(22) Filed: Aug. 21, 2001

(65) Prior Publication Data

US 2002/0059346 A1 May 16, 2002

Related U.S. Application Data

(62) Division of application No. 08/900,548, filed on Jul. 25, 1997, now Pat. No. 6,278,990.

(51) Int. Cl.[7] .............................................. G06F 17/00
(52) U.S. Cl. .............................................. 707/7; 707/3
(58) Field of Search ........................... 707/3, 1, 2, 5, 707/500, 104, 7

(56) References Cited

U.S. PATENT DOCUMENTS

| | | |
|---|---|---|
| 4,531,186 A | 7/1985 | Knapman |
| 4,868,733 A | 9/1989 | Fujisawa et al. |
| 5,043,872 A | 8/1991 | Cheng et al. |
| 5,099,426 A | 3/1992 | Carlgren et al. |
| 5,202,840 A * | 4/1993 | Wong ............................ 364/490 |
| 5,206,949 A | 4/1993 | Cochran et al. |
| 5,369,577 A | 11/1994 | Kadashevich et al. |
| 5,375,235 A | 12/1994 | Berry et al. |
| 5,459,861 A | 10/1995 | Oda |
| 5,465,353 A | 11/1995 | Hull et al. |
| 5,519,608 A * | 5/1996 | Kupiec ............................ 704/9 |
| 5,519,857 A | 5/1996 | Kato et al. |
| 5,576,954 A | 11/1996 | Driscoll |
| 5,619,718 A | 4/1997 | Correa |
| 5,696,962 A * | 12/1997 | Kupiec ............................ 707/4 |
| 5,715,443 A * | 2/1998 | Yanagihara et al. ........... 707/3 |
| 5,745,891 A * | 4/1998 | Minakuchi et al. ............ 707/3 |
| 5,787,001 A * | 7/1998 | Dietrich, Jr. et al. ... 364/468.03 |
| 5,819,273 A * | 10/1998 | Vora et al. .................... 707/10 |
| 5,907,840 A * | 5/1999 | Evans ............................ 707/5 |
| 5,926,808 A * | 7/1999 | Evans et al. ................... 707/3 |
| 5,953,728 A * | 9/1999 | Horowitz et al. ........... 707/202 |
| 5,995,962 A * | 11/1999 | Horowitz ....................... 707/5 |
| 6,138,114 A * | 10/2000 | Horowitz ....................... 707/2 |

OTHER PUBLICATIONS

Lin et al., "Fast generation of long sorted runs for sorting a large file", pp. 445–456, Sep. 1991.*

* cited by examiner

Primary Examiner—Jean M. Corrielus
(74) Attorney, Agent, or Firm—Blaney Harper; Jones, Day, Reavis & Pogue

(57) ABSTRACT

The present invention is a method for operating a computer system to retrieve information from a computer database. This method decomposes documents from the database into subdocuments and then inverts the database. Also, a query for retrieving documents from a database is decomposed into terms. The subdocuments from the inverted database and the terms from the query are then used to compute a score that indicates a quantitative relation between terms in the query and the subdocuments. The resulting list of the subdocuments and their scores is then reorganized into a heap form. The highest ranking subdocument is then selected by the computer and the text associated with this subdocument is displayed. The remainder of the subdocument score list is concurrently reheapified.

9 Claims, 6 Drawing Sheets

\*
1
\#
BW REPORT #22:
\#
\!
-1 (PA VIEW) ( ) T
-1 (IS) ( ) V
-1 (COMPARED) ( ) V
-1 (TO) ( ) P
-1 (PREVIOUS EXAMINATION) ( ) T
-1 (DATED) ( ) V
-1 (10 22 91) ( ) X
\$
-1 (SURGICAL CLIP) ( ) T
-1 (ARE) ( ) V
-1 (AGAIN) ( ) A
-1 (SEEN) ( ) V
-1 (ALONG) ( ) P
-1 (RIGHT MEDIASTINUM) ( ) T
-1 (AND) ( ) C
-1 (RIGHT HILAR REGION) ( ) T
\$
-1 (ARE) ( ) V
-1 (NEW SURGICAL CLIP) ( ) T
-1 (IN) ( ) P
-1 (DISTRIBUTION) ( ) T
-1 (OF) ( ) P
-1 (CIRCUMFLEX ARTERY) ( ) T
-1 (AS WELL AS) ( ) C
-1 (4 INTACT STERNOTOMY WIRE) ( ) T
\$
-1 (IS) ( ) V
-1 (PERSISTENT INCREASED RIGHT PARAMEDIASTINAL OPACITY) ( ) T
-1 (POSSIBLY) ( ) A
-1 (RELATED) ( ) V
-1 (TO) ( ) P
-1 (PREVIOUS RADIATION THERAPY) ( ) T
\$
-1 (NEW PLATE LIKE OPACITY) ( ) T
-1 (ARE) ( ) V
-1 (SEEN) ( ) V

*FIG. 3*

SORT SYSTEM FOR TEXT RETRIEVAL

This application is a divisional of patent application Ser. No. 08/900,548 filed Jul. 25, 1997, now U.S. Pat No. 6,278,990.

FIELD OF THE INVENTION

This invention relates to the field of database systems. More particularly, this invention relates to a system for efficient document retrieval from a database.

BACKGROUND OF THE INVENTION

The volume of documents in databases is rapidly expanding. It has been estimated that in excess of 90% of all desired intelligence information is available in documents residing in accessible databases. In order for the information in databases to be useful, a user must be able to locate specific documents relating to specific queries. Existing information retrieval systems use inefficient techniques for returning relevant documents. Generally, the existing techniques miss highly relevant documents associated with a user's query. For example, many systems use Boolean logic-based query execution techniques wherein keywords are connected together via logical or proximity operators. Such a Boolean system merely returns a list of documents, wherein each of the documents includes one of the keyword combinations.

The result of a Boolean search has no quantifiable measure of how similar the returned documents are to the query. Quantifiable measures of similarity are very useful in retrieving documents from databases because the documents can be ranked by the quantitifiable measure. In response to the shortcomings of Boolean type searches, vector space type search systems have been developed. In a vector space type search system, a score related to a particular query is computed for each document in the database. In general, a query "Q" and a document "D" can be compared by computing the shared and disjoint features of the query and the document over an orthogonal space of T terms. In such a comparison, for example, a similarity score can be computed by the following formula:

$$S(Q_i, D_j) = \frac{Q_i \cdot D_j}{|Q| \cdot |D|} = \frac{\sum_{k=1}^{t}(q_{i_k} \cdot d_{i_k})}{\sqrt{\sum_{k=1}^{t} q_{i_k}^2} \cdot \sqrt{\sum_{k=1}^{t} d_{i_k}^2}}$$

Where Qi refers to the terms in the query and Dj refers to the terms in the document.

A quantifiable similarity score for a document and query such as computed above is useful because the scores over various documents for a single query can be compared against each other. However, as is clear from an examination of the scoring formula, this scoring formula is significantly affected by variations in the number of terms per document. Since documents in a database typically have a wide range of sizes (e.g., from less than one page to more than hundreds of pages), the scoring must be normalized by size. One way to normalize the scoring is to divide individual documents into subdocuments having approximately the same size. The scoring is then computed on the basis of the subdocument. Also, scores between subdocuments are then analyzed. In this way, mere differences in a number of terms do not significantly skew the similarity analysis.

There are a variety of ways to create subdocuments from documents. A simple way is to create subdocuments that have precisely the same number of terms. Another way is to create subdocuments that have the same number of sentences. Each of these techniques helps to solve the problem of differing size documents. However, each of these techniques ignores the content of the text of the document in creating the subdocument. A technique for creating subdocuments that both forms comparable size subdocuments and takes account of the content of the subdocuments, is to make the subdocuments correspond to the paragraphs in the document.

The result of calculating similarity scores of text based on subdocuments is that a large list is generated that associates a score with a subdocument identifier and a document identifier. The number of entries on this list is much larger than the number of documents in a database because there may be many subdocuments for each document. Additionally, this list is not sorted relative to the subdocument score. Since the reason for calculating the similarity score is typically to operate on a rank ordered (by score) list of subdocuments, this entire list must be sorted by score before any other analysis can be started. The sort operation is generally an inefficient and time consuming process because a complete sort requires N log N operations where N represents the number of subdocuments.

OBJECTS OF THE INVENTION

It is an object of the present invention to analyze documents in a database.

It is a further object of the present invention to retrieve documents or parts thereof from a database that are the most relevant to a query.

It is still a further object of the present invention to retrieve the most relevant documents or parts thereof without completely sorting all of the documents or parts thereof in a database.

It is still a further object of the present invention to reduce the processing time of the computer in retrieving the most relevant documents or parts thereof from a database.

It is still a further object of the present invention to reduce the number of sort operations required by the computer in retrieving the most relevant documents or parts thereof from a database.

BRIEF DESCRIPTION OF THE DRAWING

FIG. 3 is an illustration of a listing of text that results from a noun phrase parsing process.

SUMMARY OF THE INVENTION

The present invention is a method for operating a computer system to retrieve information from a computer database. This method decomposes documents from the database into subdocuments and then inverts the database. Also, a query for retrieving documents from a database is decomposed into terms. The subdocuments from the inverted database and the terms from the query are then used to compute a score that indicates a quantitative relation between terms in the query and the subdocuments. The resulting list of the subdocuments and their scores is then reorganized into a heap form. The highest ranking subdocument is then selected by the computer and the text associated with this subdocument is displayed. The remainder of the subdocument score list is concurrently reheapified.

DETAILED DESCRIPTION OF THE INVENTION

Figure 1:
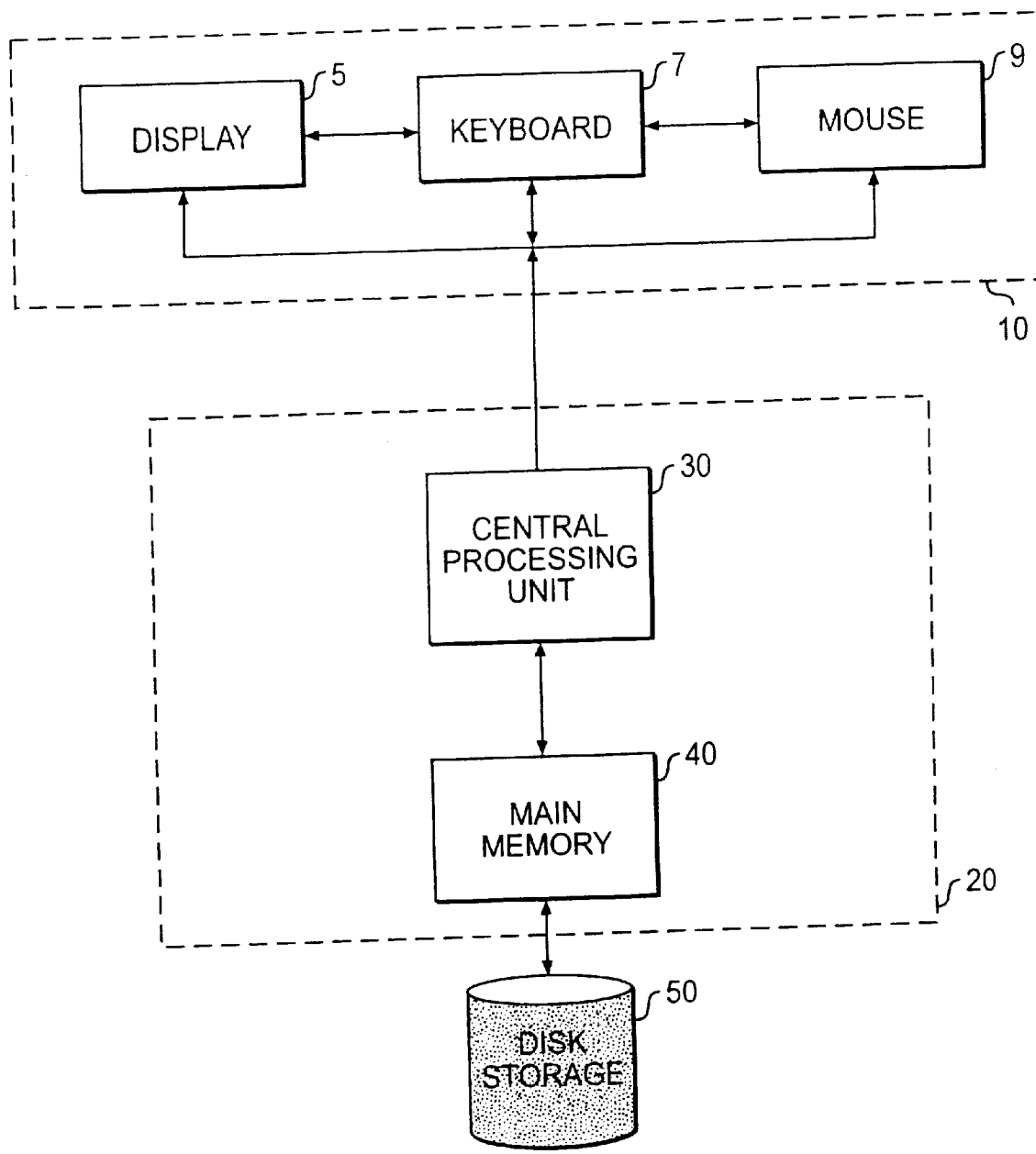
FIG. 1 is an illustration of a computer system used for retrieving documents from a database according to the present invention.

FIG. 1 is a block diagram of a computer system used for retrieving information from a database. Computer 20 comprises a central processing unit (CPU) 30 and main memory 40. Computer 20 is connected to an Input/Output (I/O) system 10 and disk storage unit 50. The I/O system 10 includes a display 5, a keyboard 7 and a mouse 9. In general, the disk storage unit 50 stores the programs for operating the computer system and it stores the documents associated with the database. The computer 20 interacts with the I/O system 10 and the disk storage unit 50. The computer 20 executes a search program that was retrieved from disk storage. The search program contains a series of instructions that cause the computer 20 to retrieve the text of documents, or parts thereof, that are stored in the database which are most relevant to a query. The query for the search is created and sent to the computer in a variety of ways. The query can be typed into keyboard 7 or selected from a predefined list by operating mouse 9 or keyboard 7. Also, the program operating the computer 20 can generate a query automatically.

The computer 20 responds to the query by retrieving documents from the database in the disk storage unit 50, and analyzing them or parts thereof to determine their relevance to the query. During the analysis process the computer 20 interacts with the disk storage unit 50 to create a series of subdocuments for each document and to compute a score for each subdocument. The computer 20 then selects the subdocuments that are most relevant to the query. The computer 20 then uses this information to retrieve the text associated with the most relevant subdocuments and/or their associated documents and to transmit that text to I/O unit 10. The computer 20 can also make use of the most relevant entries in the subdocument list by further processing the selected subdocuments, such as relating the selected subdocuments to other texts retrieved by the computer 20.

Figure 2:
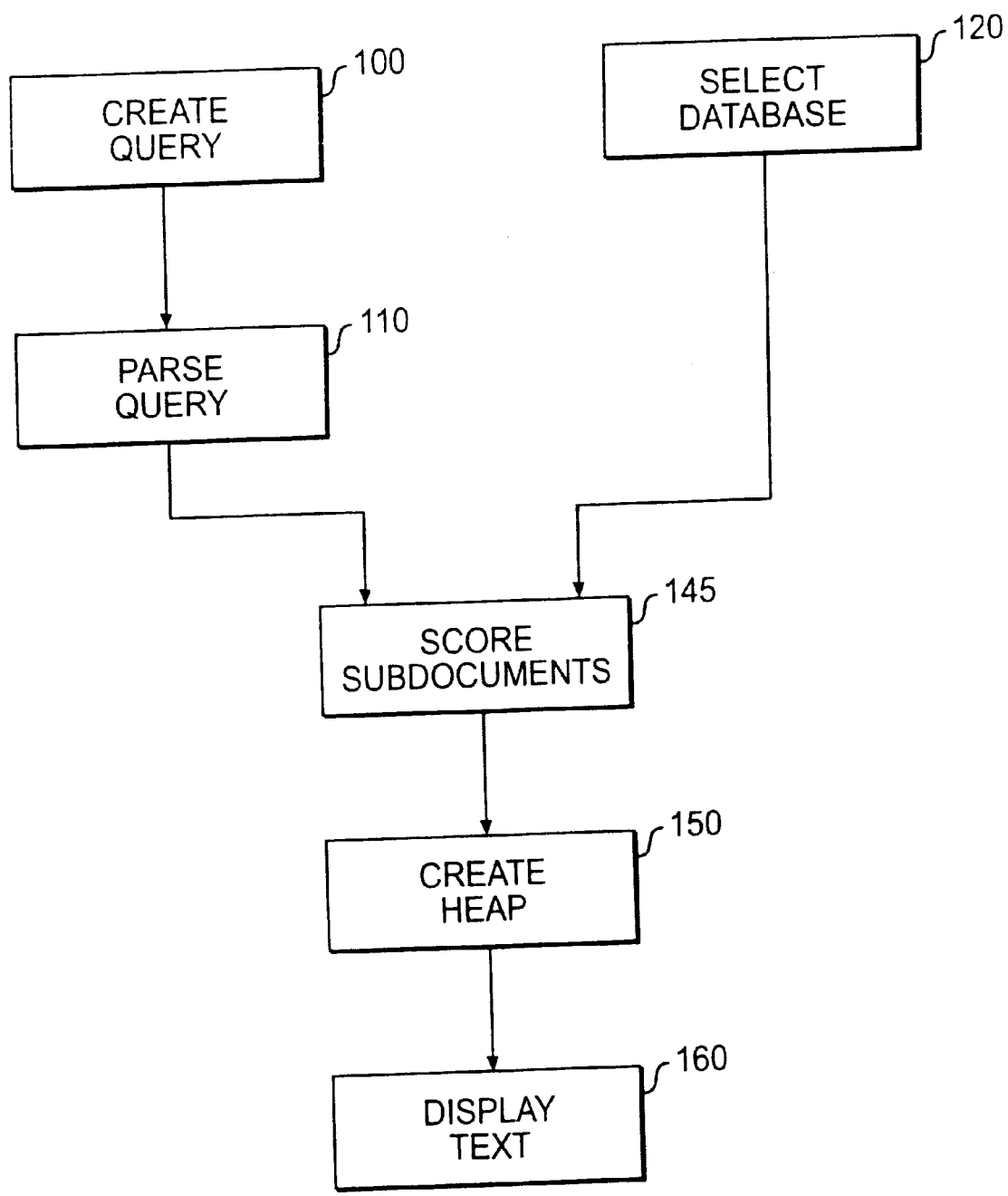
FIG. 2 is a flowchart that illustrates a process for operating a computer system to retrieve documents from a database according to an embodiment of the present invention.

FIG. 2 is a flowchart that illustrates the general operation of the computer system of FIG. 1 according to the present invention. In step 100, a query is created which forms an input into the computer 20 of FIG. 1. As noted above, this query can be created in a variety of ways. Once the query has been created, the query is parsed into a series of terms as illustrated in step 110 of FIG. 2. The parsing process is a conventional technique for creating a list of terms from text. It can be as simple a process as merely listing every word from the text. Step 110 can also, for example, utilize a more complex process in which the query text is filtered for noun phrases. In this process, linguistic structure is assigned to sequences of words in a sentence. Those terms, including noun phrases, that have semantic meaning are listed. This process can be implemented by a variety of techniques known in the art such as the use of lexicons, morphological analyzers or natural language grammar structures. FIG. 3 is an example listing of text parsed for noun phrases. As is evident from the list of FIG. 3, the phrases tagged with a 'T' are noun phrases, words tagged with a 'V' are verbs, words tagged with an 'X' are quantities, words tagged with an 'A' are adverbs and so on.

Returning to FIG. 2, in addition to processing a query, step 120 selects a database. The selection of the database does not depend on the query. The selection of the database is normally a user input to the computer system. However, in an alternate embodiment, this selection could also be an automatic process based on a predetermined list of databases in which the selection criteria is related to the query.

Figure 4:
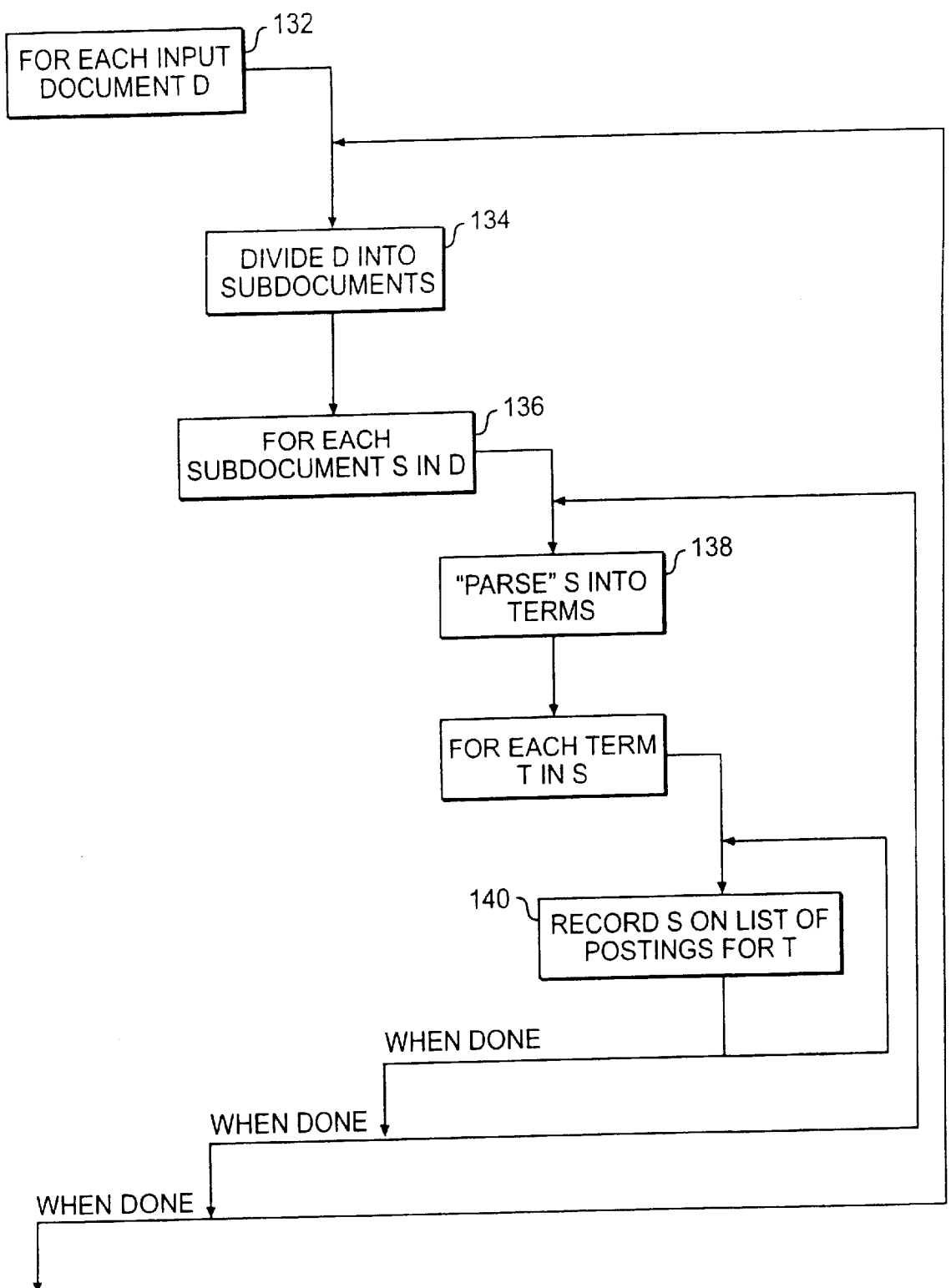
FIG. 4 is a flowchart that illustrates a process for inverting a database according to an embodiment of the present invention.

The database that is selected in step 120 has been preprocessed (when the database was originally built prior to the invocation of the process illustrated in FIG. 2) to be inverted. In general, an inverted database is a listing of all the terms of the database and the regions of text associated with those terms. FIG. 4 illustrates a process for inverting a database. In step 132, a document from the database is selected. In step 134, the document is divided into subdocuments. In this process, for example, each subdocument generally corresponds to a paragraph of the document. Long paragraphs may consist of multiple subdocuments and several short paragraphs may be included in a single subdocument. The subdocuments all have approximately the same length. In steps 136 and 138 respectively, a subdocument is selected and parsed. In this example, the parsing process is the same noun phrase parsing process used for the query in Step 110 of FIG. 2. Once a subdocument has been parsed, a term list containing subdocument noun phrases and the subdocuments in which the noun phrases appear is generated in step 140. All the subdocuments for each document are processed in this way and the list of terms and subdocuments is updated. Finally, all the documents of a database are processed according to steps 132–140. The result of this inversion process is a term list identifying all the terms (specifically noun phrases in this example) of a database and their associated subdocuments.

Figure 5:
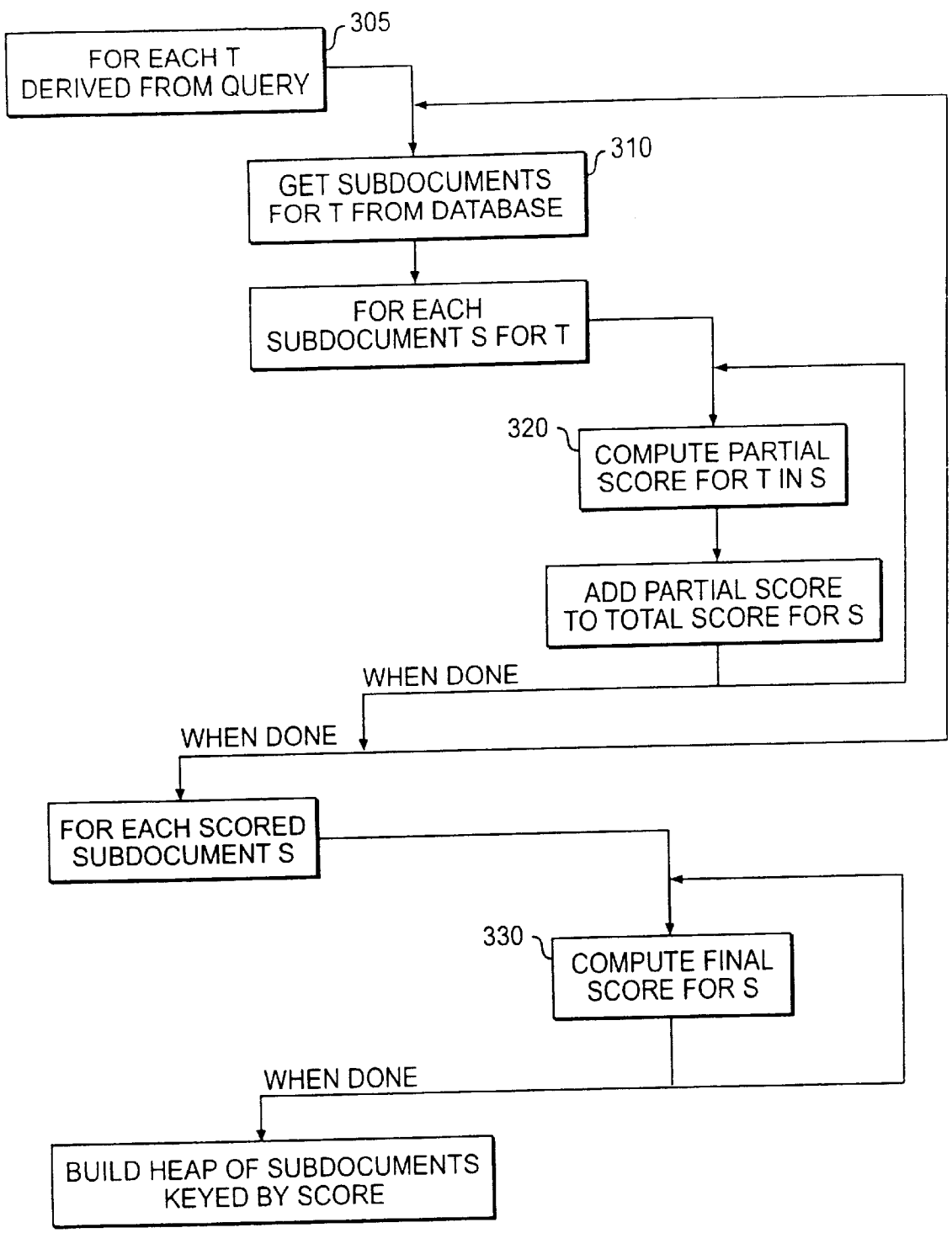
FIG. 5 is a flowchart that illustrates a process for scoring subdocuments according to an embodiment of the present invention.

Returning to FIG. 2, once the inverted database has been selected and the query has been parsed, the subdocuments are scored in step 145. FIG. 5 is an illustration of the scoring process. In step 310 of FIG. 5 the term list of the inverted database is searched to identify all the subdocuments that are associated with a term of the query. For each of the identified subdocuments, step 320 computes a partial similarity score for the particular query term and the subdocument. The computation process is repeated for each query term and subdocument. In step 330, the partial scores for each subdocument are summed or otherwise combined. As a result, when all the subdocuments have been scored for all the query terms, a subdocument score list is created in which each subdocument has an accumulated score.

After step 330 of FIG. 5, the subdocument score list contains a large number of subdocument entries that are not sorted relative to their scores. Conventional processes completely sort the subdocument score list in order to obtain the highest ranked subdocuments. Such a sort would require N log N comparison operations by the computer 20 (with N representing the number of subdocuments and being very large). As such, a conventional process requires substantial time and computer resources for this sort. Also, during this entire sort process the computer 20 cannot operate on the subdocument score list and so cannot access any search results. Additionally, the vast majority of entries in the final sorted subdocument score list will not be used because their similarity scores are too low to have significance. Thus, a conventional complete sort of the subdocument score list is inefficient and unnecessary for many operations.

Figure 6:
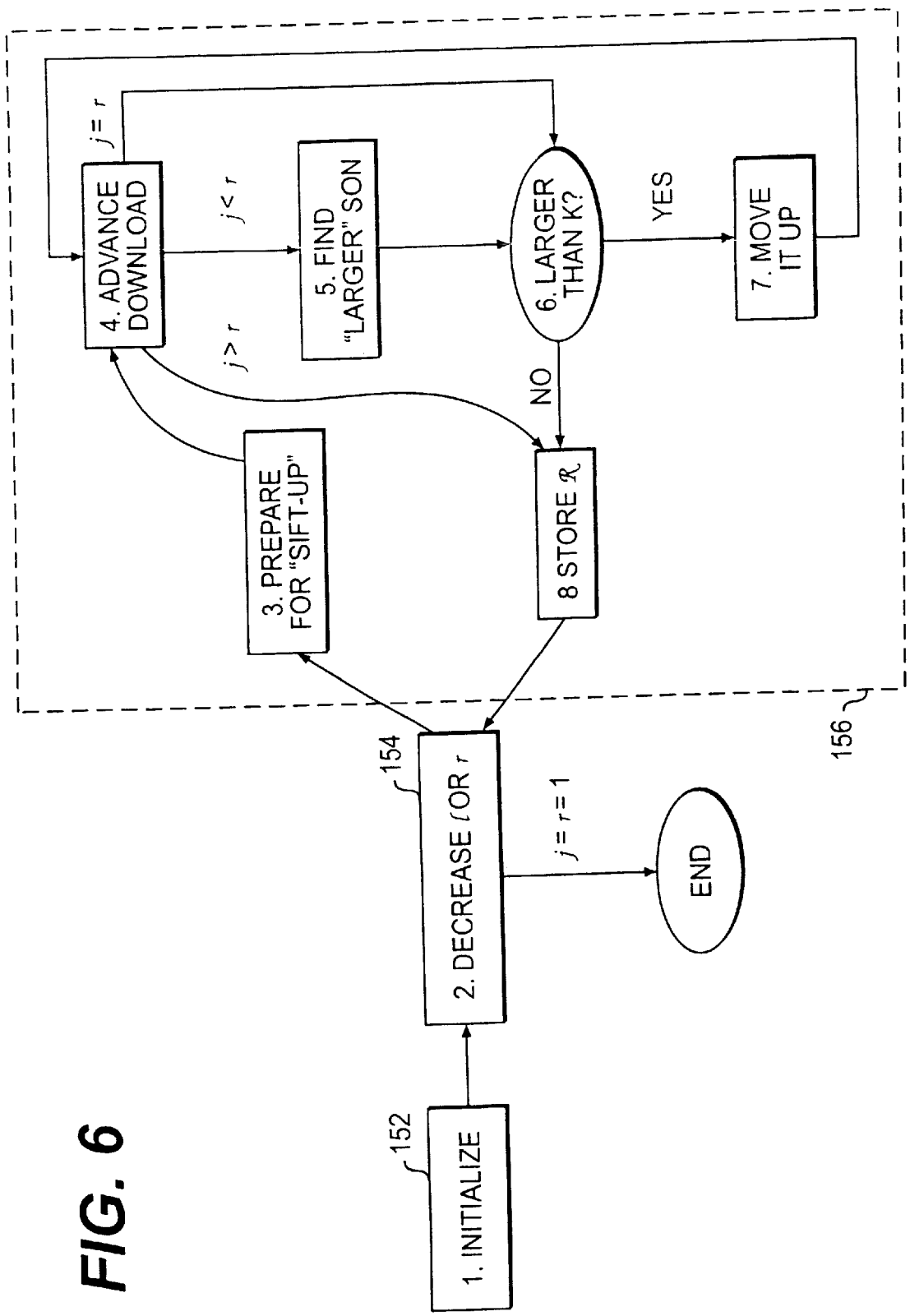
FIG. 6 is a flowchart that illustrates of a heap sort process.

Rather than perform the conventional sort on the subdocument score list after step 145 of FIG. 2, the present invention performs a modified heap sort on the subdocument score list. A heap sort is a process in which a heap is first created and then the documents with the highest scores are selected off the top of the heap to make the final sort order. FIG. 6 illustrates a general algorithm for a heap sort process. By performing a modified heap sort, the most relevant (by score) subdocuments are identified only when required. As a result, the computer does not perform all the operations of the complete sort and there is no need to wait for the complete sort to finish prior to being able to process the meaningful results of the retrieval process.

In the process of FIG. 2, step 150 transforms the subdocument score list into a heap form. This is done by initializing the heap sort process in Step 152 of FIG. 6 to l=(N/2)+1 and r=N where N is the number of subdocuments in the subdocument score list. Then the process of FIG. 6 is continued until l=1 or R<N. The N subdocument scores are in heap form when the root (highest score magnitude on the subdocument score list represented by vector a(N)) is stored at a(1), the children of a[i] are a[2i] and a[2i+1] and the magnitude of a[i/2]>a[i] for 1<i/2<i<N. When the subdocument score list is in a heap form, a[1]=max (a[i]) for 1<i<N. That is, the highest score is in the first position (a[1]) of the heap.

Since subdocuments are ranked by score to quickly select the most relevant subdocuments and since the most relevant subdocument is at the top of the heap, step 160 of FIG. 2 merely selects this subdocument for further processing by the computer 20 once the heap is created. The computer 20 can either display the text associated with this highest ranked subdocument or use the scored subdocument in some further retrieval process. Step 160 selects the highest order subdocument immediately after the heap is created without waiting for any further sorting of the subdocument score list. While the computer 20 is either displaying or further processing the highest ranking subdocument, the computer 20 is also processing in the background the remaining entries in the subdocument score list. This background processing reheapifies the remaining subdocuments (i.e., it reorganizes them back into a heap form after the highest value subdocument has been removed) by continuing the process of FIG. 6 as long as 1<R<N. As a result, when the next highest order subdocument is sought by computer 20, it can be merely selected off the top of the heap by step 160 and the remaining entries reheapified again.

According to the present invention, only approximately half of the N log N comparison operations that are required for a full sort of the subdocuments are used. This is because building the heap is sufficient to identify the highest ranking subdocuments and building the heap only requires approximately half of the total heap sort comparison operations. Moreover, since the retrieval process is only attempting to select the top M scoring subdocuments and M<<N, the heap sorting process does not perform much more than approximately half of its total sort operations. Since there are far fewer operations performed by computer 20, the retrieval process is faster. Also, since the heap sort avoids sorting irrelevant subdocuments, it is more efficient. Thus, the modified heap sort process is useful for improving the process for retrieving documents from a database.

While this invention has been particularly described and illustrated with reference to particular embodiments thereof, it will be understood by those skilled in the art that changes in the above description or illustrations may be made with respect to form or detail without departing from the spirit or scope of the invention.

I claim:

1. A method for retrieving documents from a database, comprising the steps of:
    creating a plurality of subdocuments from a plurality of documents stored in a database;
    scoring the subdocuments;
    sorting the subdocument scores via a modified heap sort, wherein said modified heap sort identifies the highest ranking subdocument from a portion of said subdocuments prior to a complete sort of said subdocuments; and
    upon completing said modified heap sort, displaying text from a document corresponding to said highest ranking subdocument.

2. The method of claim 1, wherein said portion of said subdocuments is equal to about half of said subdocuments.

3. The method of claim 1 further comprising displaying text from a plurality of documents wherein said display of said documents corresponds to a rank order of said subdocuments generated by said modified heap sort.

4. An apparatus for retrieving documents from a database, comprising:
    a computer coupled to a disk storage unit and to a display unit, said disk storage unit stores a database in at least one file;
    said computer retrieves data from said database file to create a plurality of subdocuments from a plurality of documents stored in a database file;
    said computer scores said subdocuments;
    said computer sorts the subdocument scores via a modified heap sort, wherein said modified heap sort identifies the highest ranking subdocument from a portion of said subdocuments prior to a complete sort of said subdocuments; and
    upon completing said modified heap sort, said computer displays on said display unit text retrieved from a document corresponding to said highest ranking subdocument.

5. The apparatus of claim 4, wherein said portion of said subdocuments is equal to about half of said subdocuments.

6. The apparatus of claim 4 wherein said computer displays text from a plurality of documents and wherein said display of said documents corresponds to a rank order of said subdocuments generated by said modified heap sort.

7. A computer readable media bearing sequences of computer executable instructions for retrieving documents from a database, comprising the computer-implemented steps of:
    creating a plurality of subdocuments from a plurality of documents stored in a database;
    scoring the subdocuments;
    sorting the subdocument scores via a modified heap sort, wherein said modified heap sort identifies the highest ranking subdocument from a portion of said subdocuments prior to a complete sort of said subdocuments; and
    upon completing said modified heap sort, displaying text from a document corresponding to said highest ranking subdocument.

8. The computer readable media bearing sequences of computer executable instructions of claim 7, wherein said portion of said subdocuments is equal to about half of said subdocuments.

9. The computer readable media bearing sequences of computer executable instructions of claim 7 comprising the computer-implemented step of displaying text from a plurality of documents wherein said display of said documents corresponds to a rank order of said subdocuments generated by said modified heap sort.

* * * * *